(12) United States Patent
Wenstrand

(10) Patent No.: US 6,269,769 B1
(45) Date of Patent: Aug. 7, 2001

(54) ADJUSTABLE GAME BIRD FEEDER

(76) Inventor: Thomas W. Wenstrand, 1702 Oakland Mills Rd., Mount Pleasant, IA (US) 52641

( * ) Notice: Subject to any disclaimer, the term of this patent is extended or adjusted under 35 U.S.C. 154(b) by 0 days.

(21) Appl. No.: 08/761,328

(22) Filed: Dec. 11, 1996

(51) Int. Cl.[7] .................................................. A01K 5/00
(52) U.S. Cl. ............................................................. 119/53
(58) Field of Search ........................... 119/53, 52.1, 57.9, 119/52.3, 63

(56) References Cited

U.S. PATENT DOCUMENTS

| | | | | |
|---|---|---|---|---|
| 2,365,862 | * | 12/1944 | Bufton | 119/53 |
| 2,438,080 | * | 3/1948 | Van Meeteren | 119/53 |
| 2,593,879 | * | 4/1952 | Harry | 119/53 |
| 2,884,899 | * | 5/1959 | Jackes et al. | 119/52.1 X |
| 2,941,506 | * | 6/1960 | Fulton | 119/52.1 X |

FOREIGN PATENT DOCUMENTS

2520192  *  7/1983  (FR) ........................................ 119/53

* cited by examiner

Primary Examiner—Peter M. Poon
Assistant Examiner—Yvonne R. Abbott
(74) Attorney, Agent, or Firm—Robert A. Brown

(57) ABSTRACT

An outdoor feeder for game birds and the like in which the feeder pan extends below and beyond the body of the feeder. A shield which is fastened to the body by a unique and relatively rain-proof joint extends beyond the pan to protect it, and an adjustable ring on the bottom of the body of the feeder controls both the amount of feed in the pan and the space between the ring and the bottom of the pan. The pan is adjustably fastened to the body of the feeder to adapt the feeder to differing varieties of game birds.

5 Claims, 2 Drawing Sheets

ADJUSTABLE GAME BIRD FEEDER

BACKGROUND AND SUMMARY OF THE INVENTION

This invention pertains to bird feeders and more particularly to a feeder for outside use for feeding game birds. The feeder is constructed so as to be relatively tight, keeping its contents free from precipitation damage. It is also adapted, by the use of adjustable parts, to provide flexibility for feeding certain types of birds.

Many hunting clubs and some other organizations and individuals are greatly interested in preserving a substantial supply of game birds. In some instances such as in the case of the organization called "Pheasants Forever", the organizations emphasize only a certain type of birds. In other cases, such as a hunt club, the organization may emphasize certain types of birds such as upland game birds on one hand or water fowl on another. In all cases, it is common to provide artificial feeders to supplement the natural feed supplies available to these birds.

This invention is of an improved feeder adapted to provide an outdoor installation which is well protected from precipitation whether snow or rain and which includes an adjustment adapted to provide discouragement to animals and even to certain types of birds. Thus the feeder can be made somewhat selective as to its attractiveness to a certain type of bird.

DESCRIPTION

Figure 1:
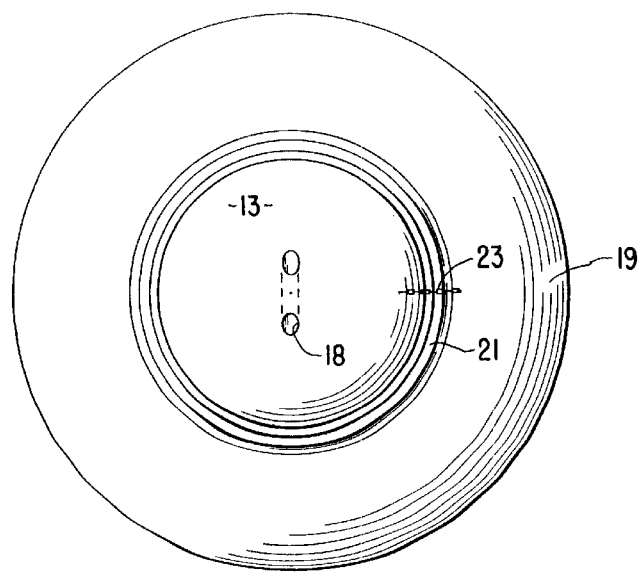
FIG. 1 is a top plan view of the feeder.
Figure 3:
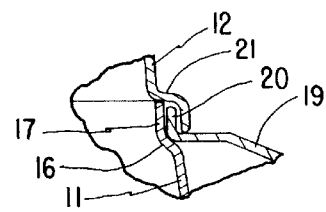
FIG. 3 is a sectional view to an enlarged scale of the joint in the feeder at the rain shield.

Briefly this invention comprises an enclosed feeder particularly adapted for outdoor use in the feeding of game birds, such as the ring-necked pheasant, which may be raised on game farms or may simply be stressed in the wild by lack of food or cover. The feeder is completely enclosed so as to be protected from precipitation and includes adjustments so that the feeder can be made more available to certain types of birds.

More specifically and referring to the drawings, the feeder comprises essentially, a feed pan 10, a lower body portion 11, an upper body portion 12 and a cover 13. The lower body 11 is generally of cylindrical shape although it is preferred that the bottom edge 15 be somewhat expanded beyond the upper edge 16. In the illustrated embodiment, the bottom edge although slightly tapered, approaches the shape of a right cylinder for a purpose to appear later in this description.

At the upper edge, a shoulder 17 is shaped and is inset towards the central axis of the feeder. This shoulder 17 forms part of an assembly joint designed to protect the inner part of the feeder.

A rain shield 19 is formed with an up-turned inner flange that fits over the shoulder 17 of the lower body. This shield 19 is of truncated conical form and extends radially outwardly from the body 11 far enough to shed any water originating above the shield 19 to a circle beyond the outer edges of the feed pan 10.

The upper body part 12 is also of generally cylindrical shape. In the illustrated example, it is also slightly conical. The shape functions to assure that the feed stored inside of the body actually flows downward. This is particularly true because the feed will then fall away from the sloping walls and into the remaining feed at the lower levels in the feeder. It also, as an added incident, allows the nesting of the upper body portion and the lower body portion when the feeder is disassembled for shipping. At the lower edge of this upper body piece 12, an outward extending shoulder 21 is formed and fits over the inward rim of the shoulder 17 and the flange 20, thus providing that moisture will drain over the joint and not inside the feeder. This type of joint is particularly important for an outdoor feeder. The moisture draining from the upper body part 12 will run over the shoulder 21 and onto the rain shield 19. From that shield the water will run off the feeder. By using a shoulder extending both downward over the shoulder 17 and flange 20, moisture is also inhibited from seeping into the feeder through the joint.

At its upper end, the upper body 12 receives a cover 13 having a lower flange 22 fitting over the upper edge of the upper body 12 and being cone shaped above that. A chain 23 attached between the upper body 12 and the cone 13 may be used to hold the cover close to the feeder when the cover is removed. A channel 18 formed as a tube extending through the tip of the cone-shaped cover 13 provide a convenient device for opening the feeders. Normally the cover can be easily removed, but if there is stickiness between the conical cover 13 and the upper body 12, a rod or dowel or even a stick of wood may be inserted into this tube to provide added convenience and rotational leverage to ease the process of opening the feeder. The channel may also be used to lift the feeder provided screws are used at the joints to hold the cover 13 and upper body part 12 and the lower body parts together.

Many of the novel features of the feeder are concerned with the lower part of the feeder. The feed pan 10 is attached to the lower body part 11 by straps 25. These straps are permanently attached to the pan, but extend upwardly from that. At their upper end, each strap includes a plurality of spaced holes 26 adapted to fit over a bolt 27 attached to the lower body. By judicious choice of which hole to use, the distance by which the pan 10 is spaced from the lower body 11 can be adjusted. The pan 10 is formed as an ordinary flat pan but has a conical upraised bottom 30.

By allowing the adjustment of the pan, the distance between the pan and the rain shield 19 can be varied. Such variations may be desired dependent on the type of bird to be fed. For example a taller bird such as a pheasant could be discouraged if the rain shield was too close to the pan 19 as it stood on the ground. But a smaller bird such as a quail or partridge would like the lower shield. Thus, the opening can be varied depending on the type of bird desired to be fed.

The pan 10 is formed as an ordinary flat pan shape having a bottom 30 and a rim 31. The bottom 30 is formed as an upraised conical shape so as to distribute the feed as equally as possible around the perimeter of the pan and to direct the feed to that perimeter where it will be available to the birds.

Figure 4:
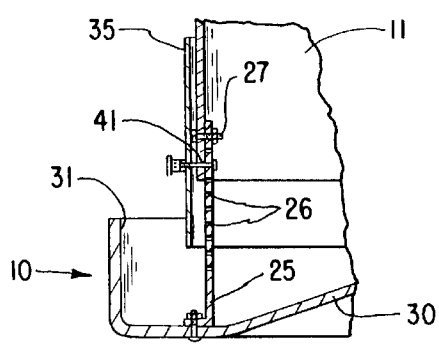
FIG. 4 is a partial sectional view from line 3—3 of FIG. 2 to an enlarged scale.
Figure 5:
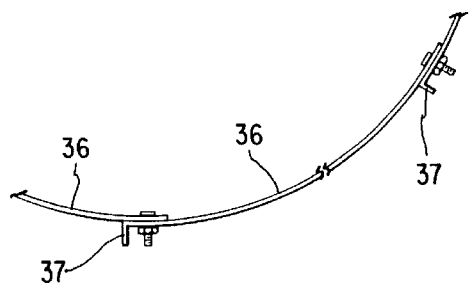
FIG. 5 is a partial sectional view from line 4—4 of FIG. 2 to a enlarged scale.

An additional adjustment to control the flow of feed into the pan 10 may be desirable. In the illustrated embodiment this adjustment is provided by use of a ring 35 formed of a plurality of segments 36 (FIG. 4). Preferably each segment has a flange 37 turned outwardly at one end of the segment.

By bolting the segments together with the flanges to the outside, a ring is produced which fits on the lower body as a belt. Applicant's preference is for three segments in the belt because of the adjustment device described later. However other numbers of segments may be used.

Figure 2:
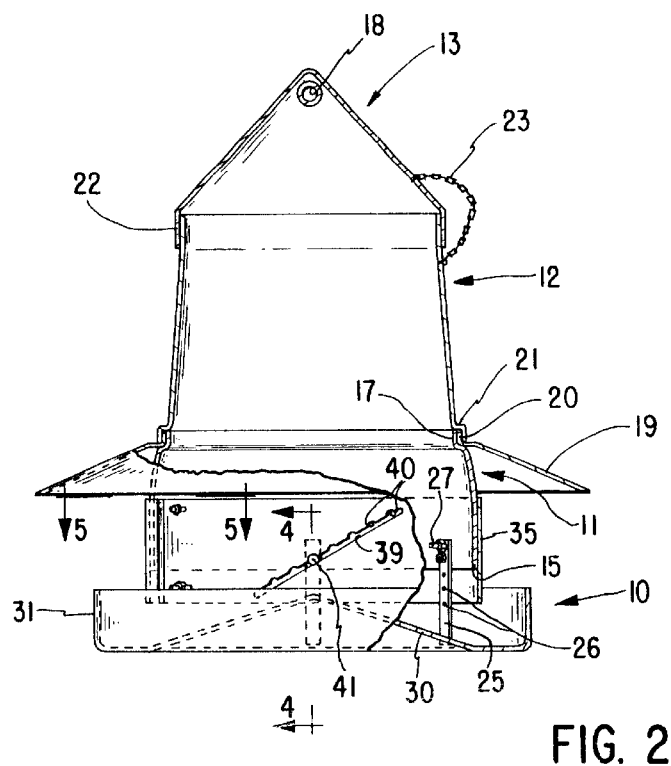
FIG. 2 is a vertical sectional view of the feeder shown in FIG. 1

The adjustment of the ring 35 is accomplished by the interaction between sloped slots 39 (FIG. 2) cut into each segment 36. The slots 39 have notches 40 and the body part 11 has a peg 41 extending from that part 11 near its lower edge. The peg 41 may simply be the body of a bolt or the like, but it is fixed to the body part 11 and extends through the slot 39. It will now be apparent that when the peg 41 extends through the slot 39 and is disengaged from the notches 40, the ring 35 can be turned and will be moved vertically because of the spiral arrangement of the slot. The turning of the ring 35 is accomplished readily by using the flanges 37 on each segment 36 of the ring as a grip to be manipulated by hand. By use of three pegs 41, the ring 35 can always be in contact with the pegs so that the notches 40 can be most effective in holding the ring when the notches 40 are engaged with the pegs 41.

The ring 38 is of a width such that it extends below the bottom edge of the lower body part 11. Thus, the ring tends to reduce the area between its lower edge and the bottom 30 of the pan 10. The variation of this constriction by rotating the ring 35 thus adjusts the area through which the feed flows from within the body of the feeder to the pan. It also allows adjustment for the different kinds of feed which may be used. Smaller pellets will not require the amount of space that a more fibrous feed might need for a similar amount of feed.

Thus, applicant has provided a feeder readily disassembled for cleaning, easily fillable, and completely weather proof for use in the outdoor feeding of game birds or the like.

What is claimed is:

1. An outdoor feeder for birds, said feeder comprising a body of substantially circular cross section and having an open upper end and an open lower end, a cover device adapted to removably close said upper end, said body being formed of an upper part and a lower part, said lower part having an indented upper edge, shield means extending outwardly from said body and having a collar adapted to fit onto said upper edge at the indentation, said upper part having an expanded lower edge adapted to fit over said collar whereby said upper part, said lower part and said shield means are attached at a seam adapted to shed moisture from said upper part over the expanded lower edge to keep said seam substantially rain proof, and a feed pan disposed below said lower end and vertically adjustably attached to said body, said feed pan extending radially beyond said body.

2. The feeder of claim 1 in which said cover device is attached to said body by flexible means attached at one end to said body and at an opposite end to said cover device.

3. The feeder of claim 1 in which a control ring surrounds said lower end of said body and extends lower than said lower end of the body, said control ring being slidably adjustable vertically on said body.

4. The feeder of claim 3 in which said control ring includes a plurality of diagonal slots, projections on said body near its lower end and extending through said slots whereby rotation of said ring relative to said body causes an interaction between said slots and said projections to cause said ring to slide axially on said body.

5. The feeder of claim 4 in which said slots are formed with notches laterally of said slots and are thus adapted to engage said projections whereby said ring can be releasably held in an adjusted portion.

* * * * *